United States Patent [19]

Molodow

[11] Patent Number: 5,516,281
[45] Date of Patent: May 14, 1996

[54] MULTIPLE JET BURNER

[76] Inventor: Marvin A. Molodow, 431 Kentucky La., McKinney, Tex. 75069

[21] Appl. No.: 383,914

[22] Filed: Feb. 6, 1995

[51] Int. Cl.$^6$ ...................................................... F23D 14/46
[52] U.S. Cl. ............................. 431/350; 431/353; 431/2; 431/10; 431/354; 431/115; 431/174
[58] Field of Search .................................. 431/350, 353, 431/354, 2, 10

[56] References Cited

U.S. PATENT DOCUMENTS

| | | | |
|---|---|---|---|
| 2,911,035 | 11/1959 | Nieman . | |
| 3,204,682 | 9/1965 | Teleshefsky . | |
| 3,298,785 | 1/1967 | Reul . | |
| 4,257,761 | 3/1981 | Musto | 431/174 |
| 4,983,118 | 1/1991 | Hovis et al. | 431/115 |
| 4,998,479 | 3/1991 | Perham et al. | 239/133 X |
| 5,112,219 | 5/1992 | Hiemstra . | |
| 5,180,300 | 1/1993 | Hovis et al. | 431/115 |
| 5,368,472 | 11/1994 | Hovis et al. | 431/115 |

OTHER PUBLICATIONS

Weiss Scientific Glass Blowing Co. advertisement in Semiconductor International magazine, pp. 69, Jan. 1993.
Applicant d.b.a. Blue Flame Technology Sold prototype, cylinderical housing, quartz burners prior to Feb. 6, 1994.

*Primary Examiner*—Larry Jones

[57] ABSTRACT

A gas burner comprising a housing with a front exit, a back surface, and an outer surface. The housing has a closed back surface at one end and an open exit at the other end. The housing is separated into a fuel-oxygen mixing chamber and a second chamber by a support plate. A multiplicity of jets passing through the support plate such that the fuel-oxygen mixing chamber is in communication with the second chamber through the jets. The fuel-oxygen mixing chamber has an inlet for a first-gas, usually a fuel gas, and an exit. The second chamber has an inlet for a second-gas, usually oxygen. The jets arranged such that each jet centerline is unique with respect to all other jet centerlines and each jet centerline is directed from the support plate to the housing exit. The housing exit contoured such that a substantially constant distance is maintained between the boundary of the exit and a closed path lying in the surface of the exit which is the shortest path circumscribing projections of the jet centerlines onto the surface of the exit. Constructing the burner entirely out of quartz or similar material is indicated. Fuel-oxygen mixing chambers in the shape of a parallelpiped, a frustum of a wedge, and a hollow circular cylinder sector for use in a radial burner are indicated. Recessing the jets with respect to the housing exit is indicated.

20 Claims, 4 Drawing Sheets

MULTIPLE JET BURNER

BACKGROUND-FIELD OF INVENTION

This invention relates to burners and more specifically to an improved burner to be used in the glass blowing arts or fiber optics field.

BACKGROUND AND SUMMARY OF THE INVENTION

The standard lathe ring burner used in the glass blowing industry has been of the types marketed by Litton Engineering Laboratories and by Carlisle Machine Work. These surface mix burners were constructed from metals such as stainless steel, nickel inconel, and other alloys. These prior art burners were originally designed to use natural gas and propane as fuels and have been used extensively for working the new higher temperature boro-silicate glasses. In the 1960's, the semiconductor industry began employing silica and dear fused quartz vessels in their integrated circuit foundries. Consequently, silica and clear fused quartz became important industrial glasses. In order to shape these glasses, extremely high working temperatures were required. Litton burners were used with hydrogen to obtain these high temperatures.

The growth of semiconductor technology through successive generations of larger silicon wafers and cleaner fabrication environs brought about the requirement for larger diameter and purer quartz vessels. Larger gas burners were required to work the larger diameter quartz tubing. The glass blowing industry responded by increasing the number of metal burners. The typical glass shop work horse burner of 1970 was a ring burner with eight single jet heads or six seven-jet heads, while that burner grew to one with twelve or fourteen seven-jet heads and, even at that size, it was difficult to develop the heat densities required to comfortably work the larger diameter tubes. Besides the generally poor performance of using metal burners, none of the prior art burners addressed the issue of quartz tubing contamination.

It is well known that fabrication of modern integrated circuits requires increasingly lower contamination environs as the circuit density increases in order to achieve acceptable silicon wafer yield rates. Towards this end, the semiconductor industry has employed quartz as vessel material because it tends to be nonreactive with the enclosed working gases and tends to cause fewer impurities in the silicon wafer. During the shaping of quartz tubing into quartz vessels, however, prior art burners exhibit metallic burner "spit," metallic particulate contamination, and other phenomena which causes contamination of the quartz vessel. The semiconductor industry's purity requirements are adversely effected by the impurities in the quartz vessel caused by prior art burners.

It is expected that the present invention will have application in the various manufacture processes for preforms used in the manufacture of glass fiber optic transmission lines. These processes are well known and generally involve deposition of a source material on a fiber optic preform. Like the semiconductor fabrication process, there is a need for pure environs in the manufacture of such fiber optic preforms. It is contemplated that the present invention be used in applying heat energy to the source material in order to provide high temperature and high purity source material for deposition. More particularly, it is intended that the present invention be used in applying heat energy to fiber optic preform raw material such that such raw material is substantially molten. Then, carrying the molten fiber optic particles through the force of the pre-ignition and post-ignition fluid flow from the present invention burner to the fiber optic preform. The molten fiber optic particles being deposited on a fiber optic preform and solidifying thereto as the particles cool.

Metal burners are at a disadvantage as compared to all-quartz burners when operated at the extremely high temperatures and heat densities required for working quartz tubing. Metal burners absorb significant amounts of heat from the work piece which leads to energy inefficiencies, flame instability, contributes to metallic-based and particle-based contamination of the work piece, and leads to melting of the metal burner itself. Melting concerns limit the economy and shape of metal burner designs, and discourage the metallic construction of burners in the configuration of the present invention because of the narrow jets and the proximity of the jets to the combustion flame and heat reflecting work piece. Metal burners also expose a human operator to the discomfort of high temperatures. Conversely, all-quartz burners are natural heat insulators and do not absorb significant amounts of heat from the work piece, thus all-quartz burners are more efficient than metal burners and do not tend to melt. Moreover, human operators are able to perform more competently, comfortably, and safely when using all-quartz burners because they do not conduct large amounts of heat energy from the work piece to the operator. Accordingly, all-quartz burners have substantial advantages over metal burners.

An all-quartz burner is constructed entirely from vitreous silica, fused silica, fused quartz, quartz glass, or other such material. This ensures that all joints are well sealed because joints and structural walls are made from the same material and are one-piece. There are no welds, brazes, press-fits, or other such fastening joints or sealing joints commonly found in metal burners. This reduces contamination from joint material and poorer sealing associated with prior art burners.

A prior art burner typically has independent discharge ports for fuel and oxygen which terminate at a face plate. The prior art burner face plate is exposed to atmospheric air, thus discouraging significant fuel-oxygen mixing before being exposed to atmospheric air and airborne contamination. Accordingly, a prior art burner mixes fuel, oxygen, and substantial amounts of atmospheric air. This leads to inefficient burning and a difficult to control and less clean combustion process. The present invention deletes the face plate on the housing exit, thus reducing weight, cost, and manufacturing difficulty. Also, deleting the face plate in the present invention burner promotes combustion in the absence of atmospheric air.

The front exit of the present invention burner is contoured such that there is a gap of approximately constant distance between the burner exit and the shortest dosed path which circumscribes a projection of all the jets onto the burner exit. For a burner with jets flush with the burner exit, this dosed path is approximately the path taken by a rubber band snugly expanded around the jets. The approximately constant distance gap promotes the development of an envelope of fuel gas which tends to surround the combustion flame. Accordingly, the fuel-oxygen mixture jet stream is isolated from the atmosphere by a fuel gas envelope. Contouring of the fuel-oxygen mixing chamber and proper sizing of the front exit of the housing with respect to the fuel-oxygen mixture jet stream permits the present invention to be operated in a mode in which an envelope of fuel gas extends from the burner exit to the work piece. This effectively produces an atmospheric-air-free combustion zone which leads to better mixing, more efficient and cleaner burning, improved flame temperature, and improved flame heat densities. A gap between the shortest closed path which circumscribes the projection of all the jets onto the burner exit and the front exit of the housing of between 0.010 and 0.120 inches gives good results.

Prior art burners have failed to design for fuel-gas mixing before exposure to atmospheric air, and moreover, have generally failed to move beyond circular face burners or cylindrical mixing chambers. As compared to cylindrical chamber or circular face prior art burners, new and unexpected results have been achieved by fuel-oxygen mixing chambers in the shape of approximately rectangular parallelepiped and frustum of a wedge contours. Housing exit aspect ratios of approximately 1.0 (square) up to 10.0 (rectangle) give good results, while aspect ratios of approximately 1.2 to 5.0 give superior results.

The present invention also promotes further substantial and predetermined mixing of fuel and oxygen by recessing the oxygen jet outlets within the fuel-oxygen mixing chamber. Recessing the jet outlets from the housing exit approximately 5% to 25% of the length of the fuel-oxygen mixing chamber has produced good result. Thus, recessing the jets provides a fuel-oxygen mixing chamber which promotes even better mixing of fuel and oxygen before exposure to atmospheric air. This results in new and unexpected results in view of the prior art because the present invention promotes better pre-exit mixing which yields more efficient burning, improved flame temperature, and improved flame heat densities. Additionally, in some embodiments of the present invention, manufacturing of the burner is significantly easier and less costly when recessed jets are employed.

Complex burner contours pro,note optimal pre-ignition mixing, combustion control, flame temperature, and heat characteristics. It is generally believed that metal burners designed with complex burner contours would involve significant potential for burner melting and prohibitively high labor costs, manufacturing costs, manufacturing precision, and manufacturing reliability. Burners with complex contours constructed from quartz glass are constructed more easily, less labor intensively, less expensively, and are more resistant to thermal stress than comparable metal burners. The present invention contemplates using contours in the shape of approximately a parallelepiped, a frustum of a general cone, a frustum of a general wedge, and other prismoids for fuel-oxygen mixing chambers, as well as a radial burner embodiment using a hollow circular cylinder sector for a fuel-oxygen mixing chamber contour. Accordingly, such burners constructed from vitreous silica, fused silica, fused quartz, quartz glass or other such material can achieve improved burner designs which lead to new and improved results by providing improved heat densities, combustion control, flame shapes, flame purity, and safety.

It is the principal object of the invention to provide a burner which is free of the mentioned disadvantages of the known burners. More particularly, the present invention provides improved heat density, flame shape, operator safety, operator comfort, combustion control, increased heat transfer, and an ultra-pure flame which significantly reduces contamination of the quartz tubing work piece and finished quartz vessel.

These and other objects are accomplished in accordance with the illustrated preferred embodiments of the present invention by providing a gas burner comprising a housing with a front exit, a back surface, and an outer surface. The housing has a closed back surface at one end and an open exit at the other end. A support plate separates the housing into a fuel-oxygen mixing chamber and a second chamber. A multiplicity of jets pass through the support plate such that the fuel-oxygen mixing chamber is in communication with the second chamber through the jets. There is no face plate on the housing exit. The fuel-oxygen mixing chamber has an inlet for a first-gas, usually a fuel gas, and an exit. The second chamber has an inlet for a second-gas, usually oxygen. The entire burner may be constructed from vitreous silica, fused silica, fused quartz, quartz glass or other such nonreactive material.

Figure 1:
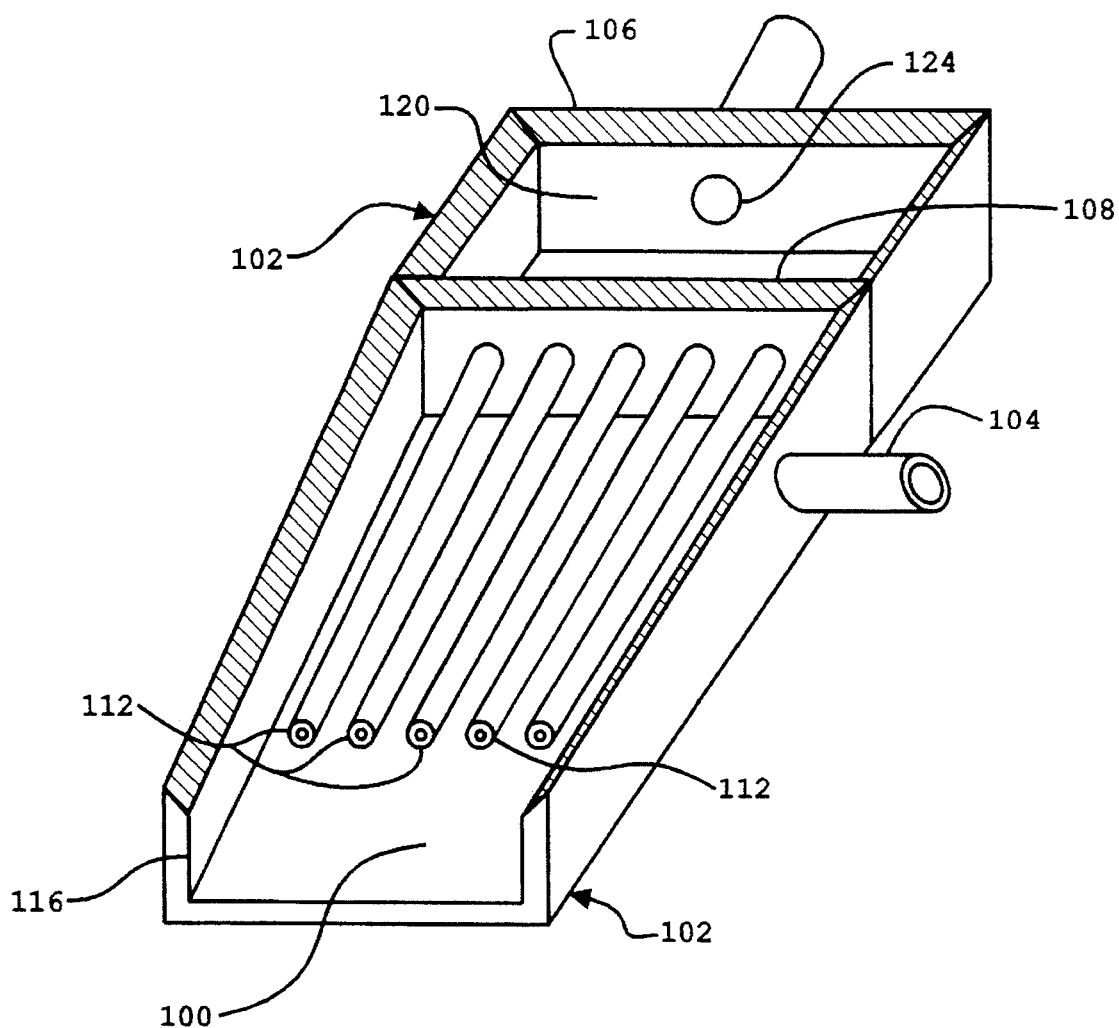
FIG. 1 shows a perspective view of a 1 row and 5 columns ("1×5") jet, rectangular face burner with housing top removed.

| Reference Numerals in Drawings | | | |
|---|---|---|---|
| 100 | fuel-oxygen mixing chamber | 102 | housing |
| 104 | first-gas inlet port | 106 | back surface |
| 108 | support plate | 110 | fuel gas envelope |
| 112 | jets | 114 | combustion-flame volume |
| 116 | exit | | |
| 124 | second-gas inlet port | 120 | second chamber |

DESCRIPTION-FIG. 1

FIG. 1 shows a perspective view of a basic version of my burner. The top surface of a housing 102 has been removed in order to show a multiplicity of jets 112 arranged in a row, in this particular embodiment a 1×5 jet configuration. A fuel-oxygen mixing chamber 100 in the approximate shape of a frustum of a right wedge is formed by housing 102 closed on one end by a support plate 108 defining the larger wedge section of the fuel-oxygen mixing chamber and open at the other end at a front exit 116 defining the smaller wedge section of the fuel-oxygen mixing chamber. The housing exit 116 is rectangular in shape with an aspect ratio of 5.0 and a gap of 0.04 inches between the inside boundary of exit 116 and the shortest closed path located in the plane of exit 116 which circumscribes a projection of the jets onto the exit 116 plane. FIG. 1 shows a focused housing 102 where the housing walls slope towards the center of front exit 116 creating a nozzle effect. A second chamber 120 is formed by housing 102 closed on one end by support plate 108 and closed on the other end by a back surface 106.

Jets 112 are attached to support plate 108 and recessed from the housing exit 116 such that the jets 112 are recessed approximately 15% of the distance from support plate 108 to the housing exit 116. Jets 112 extend into fuel-oxygen mixing chamber 100 separating the fuel gas from the oxidizing gas until termination of jets 112. Accordingly, jets 112 avoid premature mixing of fuel and oxidizing gas which improves safety and assures improved heat density, flame shape, combustion control, and increased heat transfer to the work piece.

Other configuration are contemplated in which each jet 112 of the plurality of jets 112 can be of different lengths and diameters from any or all of the other jets 112. FIG. 1 shows focused jets 112 where jets 112 slope towards the center of exit 116 approximately paralleling the housing walls creating a nozzle effect. Each jet 112 can be aligned normal to the support plate 108, focused towards the center of exit 116, focused away from the center of exit 116, or some combination of these.

Second chamber 120 communicates with fuel-oxygen mixing chamber 100 through jets 112. A first-gas inlet port 104 is mounted on housing 102 and communicates with fuel-oxygen mixing chamber 100. A second-gas inlet port 124 is mounted on housing 102 and communicates with second chamber 120. The second gas, for example oxygen gas, moves from inlet port 124 into second chamber 120, through jets 112, mixes with fuel gas in fuel-oxygen mixing chamber 100. The first gas, for example hydrogen fuel gas, moves from inlet port 104 into fuel-oxygen mixing chamber 100, mixes with oxygen gas in fuel-oxygen mixing chamber 100, then the fuel-oxygen mixture moves to exit 116 surrounded by a fuel envelope created by the 0.04 inch gap between the inside boundary of exit 116 and the shortest closed path located in the plane of exit 116 which circumscribes a projection of the jets onto the exit 116 plane.

Although not wishing to be limited to only an all-quartz burner, the entire burner can be constructed from vitreous silica, fused silica, fused quartz, quartz glass, or other such nonreactive material. Accordingly, an all-quartz burner structure is one-piece and all joints are well sealed. There are no welds, brazes, press-fits, or other such attachment requirements commonly found in metal burners.

Figure 2:
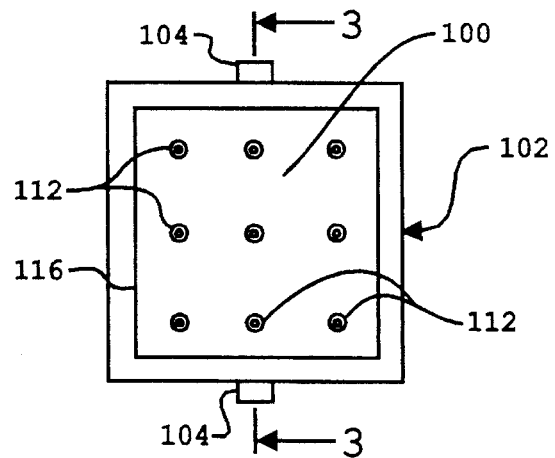
FIG. 2 shows a front view of a 3×3 jet, square face burner.
Figure 3:
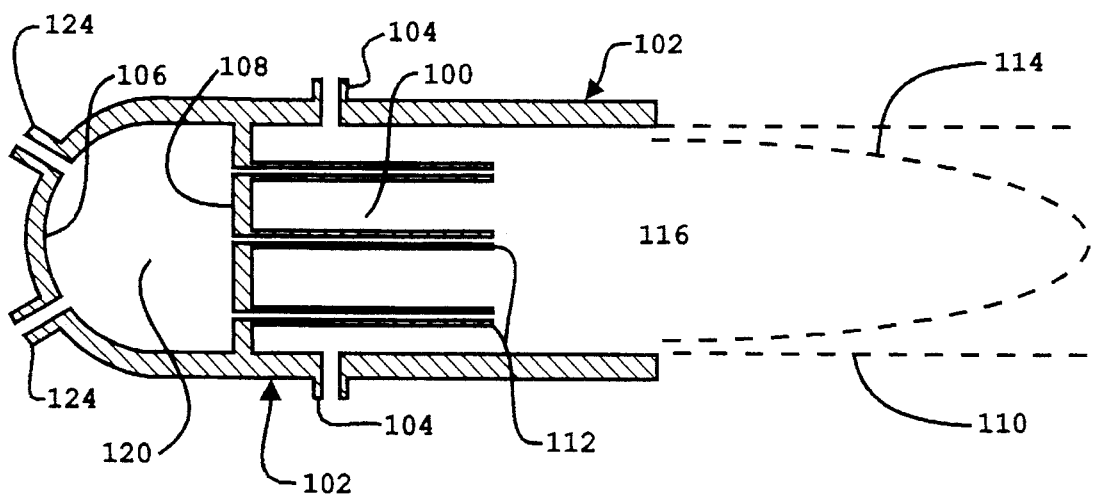
FIG. 3 is a side view of the cross section indicated by the section lines 3—3 in FIG. 2.

Description-FIGS. 2 to 3

Figure 4:
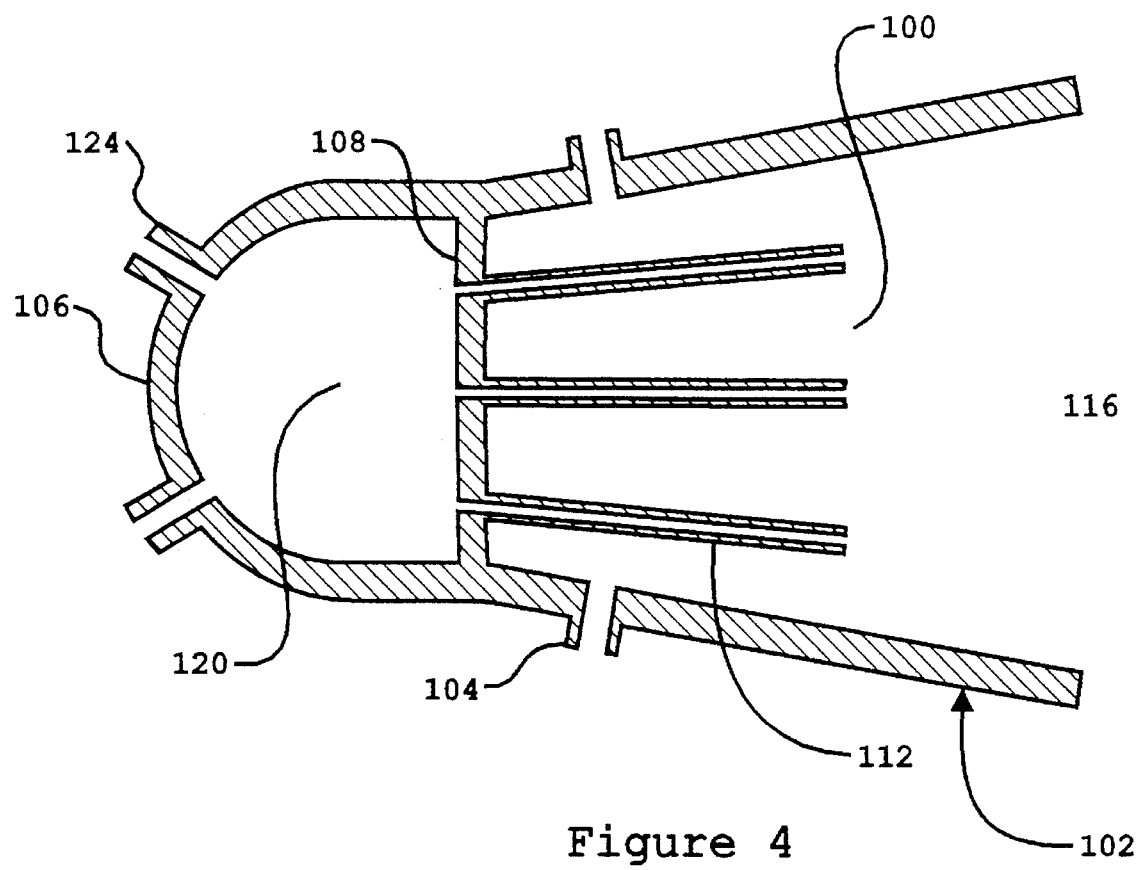
FIG. 4 shows a top view of a 3 column jet burner with housing top removed.

FIG. 2 shows a front view of a 3×3 jet, square face burner. Nine jets 112 are shown in this embodiment. The number of jets 112 can be varied from one to more than several hundred. A square face housing 102 is shown. The face, or cross section, of housing 102 can be varied substantial, for example the housing cross section may be triangular, rectangular, pentagonal, and other polygonal shapes, ellipsoidal, and other closed curve shapes, and combination polygonal and closed curve shapes. FIGS. 4–7 indicate a few specific examples, but other housing cross sections are contemplated. Cross sections which vary along a direction from support plate 108 towards exit 116, are also indicated. For example, FIG. 1 shows a focused, or nozzle, housing 102 while FIG. 4 shows a flared, or diffuser, housing 102. FIGS. 1 and 4 depict fuel-oxygen mixing chambers 100 contoured in the shape of approximate frustums of right wedges. However, FIG. 1 shows support plate 108 defining the larger wedge section, while FIG. 4 shows support plate 108 defining the smaller wedge section.

FIG. 3 is a side view of the cross section indicated by the section lines 3—3 in FIG. 2. Fuel-oxygen mixing chamber 100 is contoured as approximately a rectangular parallelepiped. Jets 112 are mounted to support plate 108 and arranged approximately parallel to housing 102. Two first-gas inlet ports 104 are mounted on housing 102 downstream of support plate 108 and provide a first-gas, for example fuel gas, to fuel-oxygen mixing chamber 100. Two second-gas inlet ports 124 are mounted on back surface 106 of housing 102 and provide a second-gas, for example oxygen gas, to second chamber 120. Second chamber 120 passes the second-gas, or oxygen, through jets 112 into fuel-oxygen mixing chamber 100 where oxygen and fuel gas mix before exiting the burner housing 102 at exit 116. A combustion-flame volume 114 extends from exit 116 to an ignition surface showing the approximate structure of a combustion flame. A fuel gas envelope 110 encloses combustion-flame volume 114.

Description-FIG. 4

FIG. 4 shows a top view of a 3 column jet 112 burner with housing top removed. Jets 112 are mounted on support plate 108 and are directed away from the center of exit 116 creating a flaring, or diffusing, effect. The housing 102 walls slope away from center of exit 116 and define a fuel-oxygen mixing chamber 100 in the shape of a frustum of a right wedge with support plate 108 defining the smaller wedge section. It is contemplated that the present invention may be constructed by flaring either jets 112 or housing 102 walls along one or more directions. For example, a rectangular face burner may only have flaring away from the exit center in the direction of the short side of the rectangle, but not in direction of the long side of the rectangle. Moreover, it is contemplated that flared jets, focused jets, flared housing, and focused housing be combined to create burner configurations.

Figure 5:
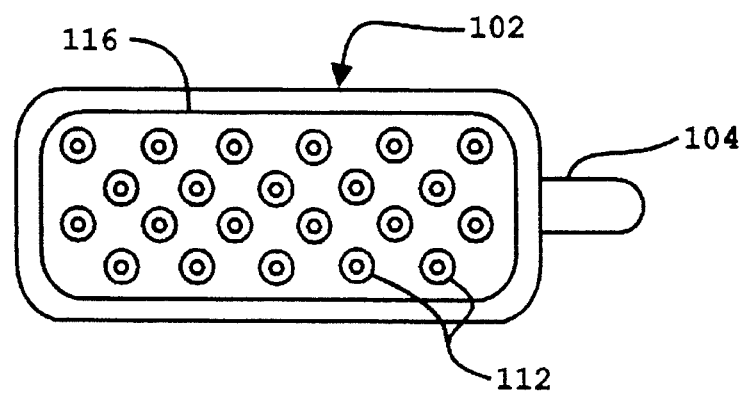
FIG. 5 shows a front view of a 4×5&6 jet, rectangular face burner

Description-FIG. 5

FIG. 5 shows a front view of a 4×5&6 jet, rectangular face burner. Jets 112 are arranged in 2 rows of 5 columns and 2 rows of 6 columns. Adjacent jet rows are offset. Jets 112 are arranged normal to exit 116 with no flaring or focusing. First-gas inlet port 104 is mounted on housing 102 along the short side of the rectangular parallelepiped housing 102.

Figure 6:
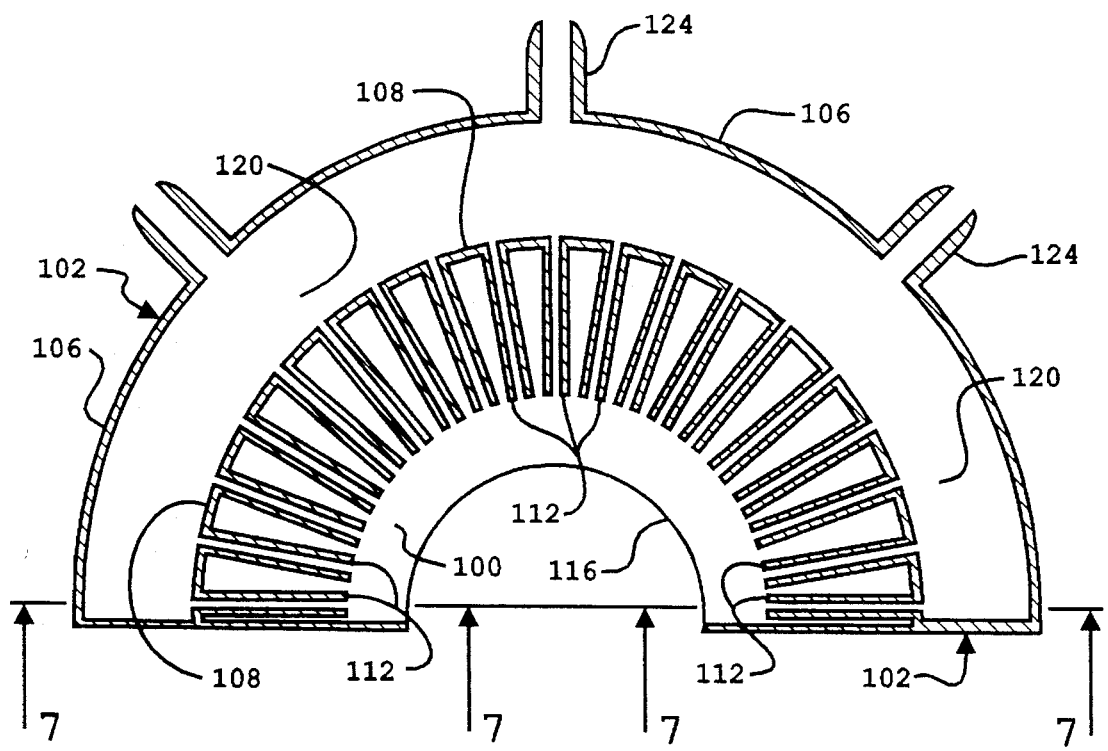
FIG. 6 shows a top view of a 1×19 jet, radial burner with housing top removed.
Figure 7:
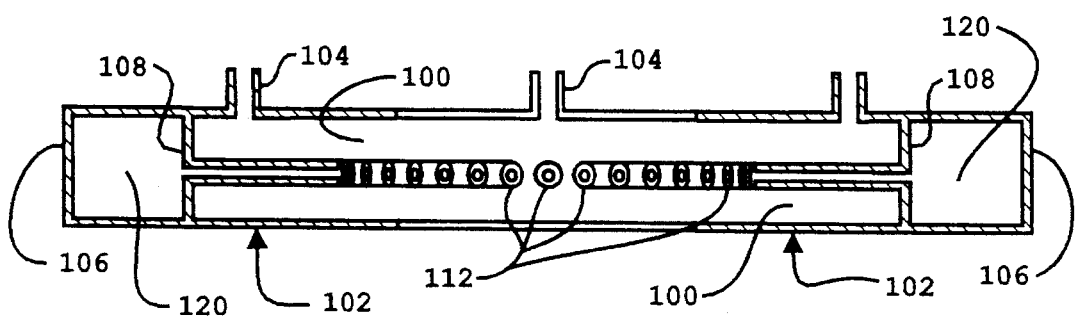
FIG. 7 is a front view indicated by the section lines 7—7 in FIG. 6.

Description-FIGS. 6 to 7

FIG. 6 shows a top view of a 1×19 jet, radial burner with housing top removed. FIG. 7 shows a front view indicated by the section lines 7—7 in FIG. 6. Second chamber 120 is a hollow right semicircular cylinder formed by housing 102, support plate 108, and back surface 106. Fuel-oxygen mixing chamber 100 is a hollow right semicircular cylinder formed by housing 102, support plate 108, and open at exit 116. Second chamber 120 and fuel-oxygen mixing chamber 100 are concentric. Second chamber 120 communicates with fuel-oxygen mixing chamber 100 through jets 112. Jets 112 are arranged in a radial manner and mounted normal to support plate 108. FIG. 6 shows three second-gas inlet ports 124 mounted on housing 102 upstream of support plate 108. FIG. 7 shows three first-gas inlet ports 104 mounted on housing 102 downstream of support plate 108. The second-gas, or oxygen, moves from second-gas inlet ports 124 into second chamber 120, through jets 112, and mixes with the first-gas, or fuel gas, in fuel-oxygen mixing chamber 100. The second-gas, or fuel gas, moves from second-gas inlet ports 104 into fuel-oxygen mixing chamber 100, mixes with oxygen gas in fuel-oxygen mixing chamber 100, and then the fuel-oxygen mixture moves to exit 116 surrounded by a fuel envelope created by a gap of approximately constant distance between the inside boundary of exit 116 and the shortest closed path located in the semicircular cylindrical surface of exit 116 which circumscribes a projection of the centerlines of the jets 112 onto the curved surface of exit 116.

Back surface 106, support plate 108, and exit 116 are shown in the top view of FIG. 6 as semicircles, while fuel-oxygen mixing chamber 100 and second chamber 120 are shown as hollow right semicircular cylinders. However, other combinations of polygons and closed curve shapes and volumes are contemplated. For example, fuel-oxygen mixing chamber 100 and second chamber 120 could be contoured as hollow circular cylinders sectored at angles other than 180 degrees, or as hollow prismoids. Back surface 106, support plate 108, and housing 102 could be shaped such that they define a wedge-like second chamber 124.

Operation-FIGS. 1 to 5

A manner of using the present invention is to connect a high pressure oxidizing gas supply, for example oxygen, to first-gas inlet port 104 and a high pressure fuel gas supply, for example hydrogen, to second-gas inlet port 124. Exit 116 is at atmospheric pressure, a lower pressure than both the first-gas and second-gas supplies, thus both the first-gas and second-gas proceed towards exit 116. Accordingly, the direction of flow from second-gas inlet port 124 and first-gas inlet port 104 to exit 116 is the downstream direction and provides a reference direction for the present invention. The second-gas moves from inlet port 124 into second chamber 120, through jets 112, and mixes with first-gas in fuel-oxygen mixing chamber 100. First-gas moves from inlet port 104 into fuel-oxygen mixing chamber 100, mixes with second gas in fuel-oxygen mixing chamber 100, then the first-gas-second-gas mixture moves to exit 116. The fuel-oxygen mixture is surrounded by a fuel gas envelope created by the gap between the inside boundary of exit 116 and the shortest closed path located in the surface of exit 116 which circumscribes a projection of the jets onto the surface of exit 116.

Although the preferred embodiment indicates a fuel gas supply connected to first-gas inlet port 104 and an oxidizing gas supply connected to second-gas inlet port 124, the invention also contemplates reversing this arrangement such that the fuel gas supply is connected to the second-gas inlet port 124 and the oxidizing gas supply is connected to the first-gas inlet port 104. Such an arrangement yields a flame with diffuse heat energy and temperature characteristics.

The present invention's inherent flame and heat characteristics are believed to be determined in part by the length, focus, and diameter of jets 112; and the length, shape, and cross section of housing 102; and the size and shape of exit 116. A burner's flame may be adjusted within its inherent flame and heat characteristic by varying the supply gas pressures at first-gas inlet port 104 and second-gas inlet port 124.

The present invention can be used in the same applications as prior art burners; additionally, the present invention is well-suited for lathe applications. A lathe mounted work piece can be heated to proper working temperatures by placing the burner such that the combustion-flame volume 114, as shown in FIG. 3, is directed toward the rotating axis of the work piece. In using the burner invention as embodied in FIGS. 1 or 5, the burner can be positioned such that the rows of jets 112 are aligned parallel with the rotating axis of the lathe mounted work piece. Such an orientation of burner to work piece increases heat energy delivered to the work piece by focusing the combustion flame where is does the most good along the work piece.

Experimentation indicates that new and unexpected heat densities, flame temperature, and heat patterns of approximately the same size as the cross sectional area, or face, of the housing exit 116 are produced on work pieces by using burners of the type indicated in FIGS. 1 or 5. Thus, smaller burners are able to provide increased areas of high heat density and temperature density. Experimentation indicates that new and unexpected efficiencies are obtained in that work pieces can be heated to higher temperatures, plus working temperatures are achieved faster than prior art burners. In particular, rectangular face burner embodiments of the present invention appear to provide approximately 40% more heat energy than prior art circular face burners. A single 1× 7 jet, rectangular face burner can heat a standard 50 millimeter quartz tubing work piece to working temperatures in a few seconds.

It is contemplated that the present invention be used in applying heat energy in the well known art of deposition of fiber optic raw material onto fiber optic preforms. Manufacturing fiber optic preforms requires high temperature and energy and molten source material substantially free of contamination. More particularly, it is intended that the present invention be used in applying heat energy to fiber optic preform raw material such that such raw material becomes substantially molten. Then, carrying the molten fiber optic particles through the force of the pre-ignition and post-ignition fluid flow from the present invention burner to the fiber optic preform. The molten fiber optic particles are then deposited onto a fiber optic preform and solidifying thereto as the particles cool.

Operation-FIGS. 6 and 7

The present invention embodied in FIGS. 6 and 7 works under the same basic principles as the other embodiments shown in FIGS. 1 to 5. The burner of FIGS. 6 and 7, however, is configured to provide heat energy and temperature combustion flame in areas of concentration that are different from those burners depicted in FIGS. 1 to 5. For example, the burner of FIGS. 6 and 7 can be positioned so that the burner collars a lathe mounted tubing work piece. In such an application, the radial burner provides concentrated heat energy and temperature along a narrow band on the rotating work piece. Thus, the work piece is heated to working temperatures significantly faster and more efficiently.

It is contemplated that the radial burner embodiment be constructed with radial jets 112 flush with exit 116, rather than recessed, in order to promote easier manufacture while still providing improved burner characteristics over prior art burners.

Summary, Ramification, and Scope

Although the description above contains many specificities, these should not be construed as limiting the scope of the invention but as merely providing illustrations of some of the presently preferred embodiments of this invention. For example, fuel-oxygen mixing chamber 100 could be hour glass shaped, a frustum of a general cone, or some combination of prismoid and spheroid shapes. Other variations include for example, first-gas inlet port 104 and second-gas inlet port 124 could have various cross sections and shapes, such as square, round, ellipsoid, other shaped cross sections; and second chamber 120 could be prismoid, hemispheroid, conical, bulbed, or other such chamber shape. Also, the various burner elements disclosed in this application alone tend to provide improved burner performance, while when combined with other elements disclosed in this application tend to promote synergistic results. For example, a fuel-oxygen mixing chamber 100 in the shape of a rectangular parallelepiped alone tends to promote good burner performance, while when combined with recessed jets 112 that burner performance tends to be further improved, and more than might be expected from recessing the jets 112 in combination with a cylindrical fuel-oxygen mixing chamber 100 in a circular face burner.

Thus the scope of the invention should be determined by the appended claims and their legal equivalents, rather than by the examples given.

What is claimed is:

1. A multiple-jet, mixing gas burner comprising:
    (a) a housing means, said housing means having a front exit, a back surface, and an outer surface;
    (b) a multiplicity of jets;
    (c) a support means within said housing means for supporting said multiplicity of jets;
    (d) a jet centerline for each of the jets defined by the centerline normal to the cross sectional area at the outlet of each of the jets; said multiplicity of jets arranged such that each said jet centerline is directed from said support means to said front exit of said housing means;
    (e) a closed jet centerline path lying in the surface of said front exit of said housing means, said closed jet centerline path being the shortest closed path which circumscribes said jet centerlines;
    (f) a gap measured from a point on the boundary of said exit of said housing means to the nearest point on said closed jet centerline path, said front exit of said housing means contoured such that said gap associated with any point on boundary of said exit of said housing means is an approximately constant distance from the selected point on boundary of said exit of said housing to the nearest point on said closed jet centerline path;
    (g) a first-gas porting means for permitting entry of a first gas into said housing means;
    (h) a mixing chamber within said housing means for receiving said first gas entering said housing means at said first-gas porting means, said mixing chamber being located adjacent said support means and adjacent said front exit of said housing means;
    (i) a second-gas porting means for permitting entry of a second gas into said housing means;
    (j) a second chamber within said housing means for receiving said second gas entering said housing means at said second-gas porting means, said second chamber being located adjacent said support means and adjacent said back surface of said housing means, said second chamber in communication with said mixing chamber through said multiplicity of jets;
    (k) said approximately constant distance gap varying no more than approximately 50% to 200% of nominal, said approximately constant distance gap equal to the sum of the distance:
        (a) from said jet centerline of the largest diameter jet to the outer wall of the largest diameter jet;
        (b) and a number between 0.010 and 0.120 inches;
    (l) said mixing chamber defining a volume substantially in the shape selected from the group consisting of:
        (a) a parallelepiped, and
        (b) a frustum of a wedge, and
        (c) a frustum of a cone, and
        (d) a hollow circular cylinder sector.

2. The mixing gas burner of claim 2, wherein all elements are made of quartz.

3. The mixing gas burner of claim 2, wherein said multiplicity of jets are recessed from said front exit of said housing means such that the longest jet is no closer to said front exit of said housing than a distance of between 5% to 25% of the shortest distance between said support means and said front exit of said housing means.

4. A multiple-jet, mixing gas burner comprising:
    (a) a housing means, said housing means having a front exit, a back surface, and an outer surface;
    (b) a multiplicity of jets;
    (c) a support means within said housing means for supporting said multiplicity of jets;
    (d) a jet centerline for each of the jets defined by the centerline normal to the cross sectional area at the outlet of each of the jets; said multiplicity of jets arranged such that each said jet centerline is directed from said support means to said front exit of said housing means;
    (e) a closed jet centerline path lying in the surface of said front exit of said housing means, said closed jet centerline path being the shortest closed path which circumscribes said jet centerlines;
    (f) a gap measured from a point on the boundary of said exit of said housing means to the nearest point on said closed jet centerline path, said front exit of said housing means contoured such that said gap associated with any point on boundary of said exit of said housing means is an approximately constant distance from the selected point on boundary of said exit of said housing to the nearest point on said closed jet centerline path;
    (g) a first-gas porting means for permitting entry of a first gas into said housing means;
    (h) a mixing chamber within said housing means for receiving said first gas entering said housing means at said first-gas porting means, said mixing chamber being located adjacent said support means and adjacent said front exit of said housing means;
    (i) a second-gas porting means for permitting entry of a second gas into said housing means;
    (j) a second chamber within said housing means for receiving said second gas entering said housing means at said second-gas porting means, said second chamber being located adjacent said support means and adjacent said back surface of said housing means, said second chamber in communication with said mixing chamber through said multiplicity of jets;
    (k) said approximately constant distance gap varying no more than approximately 50% to 200% of nominal, said approximately constant distance gap equal to the sum of the distance:
        (a) from said jet centerline of the largest diameter jet to the outer wall of the largest diameter jet;
        (b) and a number between 0.010 and 0.120 inches;
    (l) all elements of said mixing gas burner made of quartz.

5. The mixing gas burner of claim 4, wherein said multiplicity of jets are recessed from said front exit of said housing means such that the longest jet is no closer to said front exit of said housing than a distance of between 5% to 25% of the shortest distance between said support means and said front exit of said housing means.

6. A multiple-jet, mixing gas burner comprising:
    (a) a housing means, said housing means having a front exit, a back surface, and an outer surface;
    (b) a multiplicity of jets;
    (c) a support means within said housing means for supporting said multiplicity of jets;

(d) a jet centerline for each of the jets defined by the centerline normal to the cross sectional area at the outlet of each of the jets; said multiplicity of jets arranged such that each said jet centerline is directed from said support means to said front exit of said housing means;

(e) a closed jet centerline path lying in the surface of said front exit of said housing means, said closed jet centerline path being the shortest closed path which circumscribes said jet centerlines;

(f) a gap measured from a point on the boundary of said exit of said housing means to the nearest point on said closed jet centerline path, said front exit of said housing means contoured such that said gap associated with any point on boundary of said exit of said housing means is an approximately constant distance from the selected point on boundary of said exit of said housing to the nearest point on said closed jet centerline path;

(g) a first-gas porting means for permitting entry of a first gas into said housing means;

(h) a mixing chamber within said housing memos for receiving said first gas entering said housing means at said first-gas porting means, said mixing chamber being located adjacent said support means and adjacent said front exit of said housing means;

(i) a second-gas porting means for permitting entry of a second gas into said housing means;

(j) a second chamber within said housing means for receiving said second gas entering said housing means at said second-gas porting means, said second chamber being located adjacent said support means and adjacent said back surface of said housing means, said second chamber in communication with said mixing chamber through said multiplicity of jets;

(k) said multiplicity of jets recessed from said front exit of said housing means such that the longest jet is no closer to said front exit of said housing than a distance of between 5% to 25% of the shortest distance between said support means and said front exit of said housing means.

7. The mixing gas burner of claim 6, wherein said mixing chamber defines a volume substantially in the shape selected from the group consisting of:

(a) a parallelepiped, and
(b) a frustum of a wedge, and
(c) a frustum of a cone, and
(d) a hollow circular cylinder sector.

8. The mixing gas burner of claim 7, wherein said approximately constant distance gap varies no more than approximately 50% to 200% of nominal, said approximately constant distance gap equal to the sum of the distance:

(a) from said jet centerline of the largest diameter jet to the outer wall of the largest diameter jet;
(b) and a number between 0.010 and 0.120 inches.

9. The mixing gas burner of claim 6, wherein said approximately constant distance gap varies no more than approximately 50% to 200% of nominal, said approximately constant distance gap equal to the sum of the distance:

(a) from said jet centerline of the largest diameter jet to the outer wall of the largest diameter jet;
(b) and a number between 0.010 and 0.120 inches.

10. The mixing gas burner of claim 6, wherein all elements are made of quartz.

11. The mixing gas burner of claim 10, wherein said mixing chamber defines a volume substantially in the shape selected from the group consisting of:

(a) a parallelepiped, and
(b) a frustum of a wedge, and
(c) a frustum of a cone, and
(d) a hollow circular cylinder sector.

12. A multiple-jet, mixing gas burner comprising:

(a) a housing means, said housing means having a front exit, a back surface, and an outer surface;

(b) a multiplicity of jets;

(c) a support means within said housing means for supporting said multiplicity of jets;

(d) a jet centerline for each of the jets defined by the centerline normal to the cross sectional area at the outlet of each of the jets; said multiplicity of jets arranged such that each said jet centerline is directed from said support means to said front exit of said housing means;

(e) a closed jet centerline path lying in the surface of said front exit of said housing means, said closed jet centerline path being the shortest closed path which circumscribes said jet centerlines;

(f) a gap measured from a point on the boundary of said exit of said housing means to the nearest point on said closed jet centerline path, said front exit of said housing means contoured such that said gap associated with any point on boundary of said exit of said housing means is an approximately constant distance from the selected point on boundary of said exit of said housing to the nearest point on said closed jet centerline path;

(g) a first-gas porting means for permitting entry of a first gas into said housing means;

(h) a mixing chamber within said housing means for receiving said first gas entering said housing means at said first-gas porting means, said mixing chamber being located adjacent said support means and adjacent said front exit of said housing means;

(i) a second-gas porting means for permitting entry of a second gas into said housing means;

(j) a second chamber within said housing means for receiving said second gas entering said housing means at said second-gas porting means, said second chamber being located adjacent said support means and adjacent said back surface of said housing means, said second chamber in communication with said mixing chamber through said multiplicity of jets;

(k) said mixing chamber exit substantially in the shape of a rectangle having an aspect ratio of approximately 1.0 to 10.0.

13. The mixing gas burner of claim 12, wherein said mixing chamber defines a volume substantially in the shape selected from the group consisting of:

(a) a parallelepiped, and
(b) a frustum of a wedge.

14. The mixing gas burner of claim 13, wherein all elements are made of quartz.

15. The mixing gas burner of claim 12, wherein all elements are made of quartz.

16. A process for mixing and combusting a fuel gas and oxygen gas, comprising the steps of:

(a) burning the fuel with a burner comprising a housing means having a front exit, at least one side surface, and a back surface; a multiplicity of jets, said jets disposed in said housing means; a support means for supporting said multiplicity of jets; a mixing chamber and a second chamber located within said housing means, wherein said mixing chamber is defined by said side surface of said housing means, said front exit of said housing means, and said support means, and wherein said second chamber is defined by said side surface of said housing means, said back surface of said housing means, and said support means; said multiplicity of jets providing the sole means for communicating between said mixing chamber and said second chamber; a jet centerline defined by the centerline normal to the cross sectional area of the outlet of each of the jets; said multiplicity of jets arranged such that each jet centerline is directed from said support means to said front exit of said housing means; said front exit of said housing means boundary a substantially constant distance from a closed path lying in the surface of said exit of said housing means, said closed path being the shortest path circumscribing projections of said jet centerlines onto surface of said exit of said housing means;

(b) providing high pressure oxygen gas to the second chamber to encourage said oxygen gas to move downstream toward the housing exit; mixing oxygen gas into said fuel gas at outlet of the jets by passing oxygen from said second chamber through said multiplicity of jets into mixing chamber;

(c) providing high pressure fuel gas to said mixing &amber; said fuel gas moving among exterior of said multiplicity of jets; said fuel gas proceeding downstream towards the housing exit and mixing with oxygen gas exiting the outlets of the jets;

(d) providing a fuel gas envelope surrounding the mixture and extending beyond the housing means exit, said fuel gas envelope creating a substantially atmospheric-air-free combustion volume within the envelope;

(e) combusting mixture in substantially atmospheric-air-free environment by using said fuel gas envelope to isolate the combustion process from atmospheric air.

17. The process of claim 16, wherein all processes are carried out under conditions such that:

(a) all burner elements are made of quartz;

(b) wherein said approximately constant distance gap of the burner varies no more than approximately 50% to 200% of nominal, said approximately constant distance gap equal to the sum of the distance:
  (i) from said jet centerline of the largest diameter jet to the outer wall of the largest diameter jet;
  (ii) and a number between 0.010 and 0.120 inches;

(c) wherein said mixing chamber defines a volume substantially in the shape selected from the group consisting of:
  (i) a parallelepiped, and
  (ii) a frustum of a wedge, and
  (iii) a frustum of a cone, and
  (iv) a hollow circular cylinder sector.

18. The process of claim 17, wherein the combustion flame of the process is used in a deposition process, said deposition process associated with:

(a) an application of a combustion flame of said burner to fiber optic particles;

(b) carrying molten fiber optic particles to a fiber optic preform by using pre-ignition and post-ignition fluid power from said burner;

(c) deposition of said molten fiber optic particles on said fiber optic preform.

19. The process of claim 16, wherein the combustion flame of the process is used in a deposition process, said deposition process associated with:

(a) an application of a combustion flame of said burner to fiber optic particles;

(b) carrying molten fiber optic particles to a fiber optic preform by using pre-ignition and post-ignition fluid power from said burner;

c) deposition of said molten fiber optic particles on said fiber optic preform.

20. The process of claim 16, wherein the combustion flame of the process is used in the manufacture of fiber optic strands.

* * * * *